United States Patent
Schwager et al.

(10) Patent No.: US 9,634,720 B2
(45) Date of Patent: Apr. 25, 2017

(54) APPARATUSES AND A METHOD FOR CROSSTALK ESTIMATIONS

(71) Applicant: Sony Corporation, Minato-ku (JP)

(72) Inventors: Andreas Schwager, Waiblingen (DE); Martin Fritz, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 280 days.

(21) Appl. No.: 14/320,814

(22) Filed: Jul. 1, 2014

(65) Prior Publication Data

US 2015/0009793 A1 Jan. 8, 2015

(30) Foreign Application Priority Data

Jul. 5, 2013 (EP) .................................... 13175441

(51) Int. Cl.
- *H04B 3/32* (2006.01)
- *H04B 3/54* (2006.01)
- *H04B 3/487* (2015.01)

(52) U.S. Cl.
CPC ............... *H04B 3/32* (2013.01); *H04B 3/487* (2015.01); *H04B 3/54* (2013.01)

(58) Field of Classification Search
CPC . H04B 3/32; H04B 3/487; H04B 3/54; H04B 17/345; H04B 2203/5425; H04B 2203/5495; H04M 3/34; H04M 3/5166; H04M 11/06; H04M 11/062; H04W 52/225; Y02B 60/50

See application file for complete search history.

(56) References Cited

U.S. PATENT DOCUMENTS

| 7,173,959 | B2 | 2/2007 | Kaku |
| 7,359,431 | B2 | 4/2008 | Kwon et al. |
| 2003/0210734 | A1 | 11/2003 | Kaku |
| 2006/0256890 | A1 | 11/2006 | Kaku et al. |
| 2014/0369430 | A1* | 12/2014 | Parnell ...................... H04B 3/32 375/257 |

(Continued)

FOREIGN PATENT DOCUMENTS

| EP | 1530313 A1 * | 5/2005 | ............ H04B 3/542 |
| EP | 1 845 679 A2 | 10/2007 | |
| WO | WO 2012/084221 A2 | 6/2012 | |

OTHER PUBLICATIONS

ETSI "PowerLine Telecommunications (PLT): Study on signal processing improving the coexistence of VDSL2 and PLT", ETSI, TR 102 930 V1.1.1 (Sep. 2010) Technical Report, 35 pages.

(Continued)

*Primary Examiner* — Omar Ghowrwal
(74) *Attorney, Agent, or Firm* — Oblon, McClelland, Maier & Neustadt, L.L.P.

(57) ABSTRACT

It is described an apparatus for determining a PLC-to-DSL crosstalk estimate. The apparatus comprises a PLC-to-DSL channel estimator which is arranged to receive an input signal, comprising a DSL contribution and a PLC-to-DSL crosstalk contribution, and which is arranged to determine channel state information of a PLC-to-DSL channel responsible for the PLC-to-DSL crosstalk contribution in the input signal. The apparatus further comprises a crosstalk processor which is arranged to determine the PLC-to-DSL crosstalk estimate based on the channel state information and a reconstructed PLC transmit signal.

7 Claims, 22 Drawing Sheets

(56) References Cited

U.S. PATENT DOCUMENTS

2016/0087864 A1* 3/2016 Kerpez ................ H04L 1/20
370/242

OTHER PUBLICATIONS

ETSI, "PowerLine Telecommunications (PLT): Coexistence between PLT Modems and Short Wave Radio broadcasting services", ETSI TS 102 578 V1.2.1 (Aug. 2008), Technical Specification, 16 pages.
Andrea Colmegna et al., "Methods for Supporting Vectoring when Multiple Service Providers Share the Cabinet Area", Apr. 2012, 11 pages.
Ralph Santitoro, "Metro Ethernet Services—A Technical Overview", Metro Ethernet Forum, v2.7, pp. 1-19, 2003.
HD-PLC is ready for new approved EMC Standard for Broadband Power line Communications, HD-PLC, Nov. 2012 (1 page).
Series G: Transmission Systems and Media, Digital Systems and Networks, Overview of Digital subscriber line Recommendations, International Telecommunication Union, ITU-T, Telecommunications Standardization Sector of ITU, Series G, Supplement 50, Sep. 2011 (62 pages).
PowerLine Telecommunications (PLT): MIMO PLT Universal Coupler, Operating Instructions—Description, ETSI TR 101 562 v.1.1.1, May 2011 (24 pages).

* cited by examiner

APPARATUSES AND A METHOD FOR CROSSTALK ESTIMATIONS

The disclosure relates to apparatus and methods for crosstalk compensation in power line communication modems and/or digital subscriber line modems.

BACKGROUND

Power line communication (PLC), also called mains communication, power line transmission, or power line networking (PLN), is a communication technology which uses existing power distribution cables for transmitting data. Modulated carriers are impressed on the standard 50 Hz or 60 Hz alternating current. High-frequency power line communication uses carrier frequencies up to 30 MHz and more. Power line communication can for example be used in a home to interconnect computers and peripherals and home entertainment devices. Power line modems intended for home use, also called power line stations or power line adapters, typically plug into power outlets and establish a high-speed data connection using the existing electrical wiring in the home. A power line modem may also be integrated within an electronic device to allow connection of the electronic device to a local network.

Digital subscriber line (DSL) denotes a family of technologies (ADSL, VDSL, VDSL2) that provide high-speed digital communications by transmitting digital data over the wires of a local telephone network. DSL is typically used to connect households to the Internet. Today, VDSL2 modems modulate frequencies up to 30 MHz.

Power line communication (PLC) might interfere with digital subscriber line (DSL) communication. The publication ETSI TR 102 930; "PowerLine Telecommunications (PLT); Study on signal processing improving the coexistence of VDSL2 and PLT"; ETSI 2010; suggests methods to reduce or mitigate the crosstalk between electricity and telephone cables. The disclosed methods are based on an adaptive interference cancelling filter and spectral management.

Today, PLC modems use the frequency range above 30 MHz only with a very limited power spectral density (PSD). However, in order to achieve higher data rates or coverage, it is envisaged to enable higher feeding limits for PLC in those frequencies. In this case there is a high potential to observe interferences from PLC to frequency modulated (FM) radio broadcast.

The publication ETSI TS 105 578; Power line Telecommunications; "Coexistence between PLT modems and short wave radio broadcasting services"; ETSI 2008; describes an adaptive frequency notching technique, which on the one hand has a minimum impact on data throughput and QoS (Quality of Service) requirements and, on the other hand refuses interference between PLT (Power line telecommunications) and short wave radio broadcast.

There is a need to improve power line communication modems and digital subscriber line modems to reduce effects of crosstalk with interfering technologies.

SUMMARY

Apparatus for determining a PLC-to-DSL crosstalk estimate, apparatus for determining a DSL-to-PLC crosstalk estimate and respective methods to determine a PLC-to-DSL crosstalk estimate or a DSL-to-PLC crosstalk estimate as defined in the appended claims are disclosed. PLC devices and DSL devices as defined in the appended claims are also disclosed.

BRIEF DESCRIPTION OF THE DRAWINGS

Details of the disclosed apparatus and methods will become more apparent from the following description of embodiments in connection with the accompanying drawings, of which

DETAILED DESCRIPTION OF THE EMBODIMENTS

Embodiments are now described with reference to the appended drawings.

Figure 1:
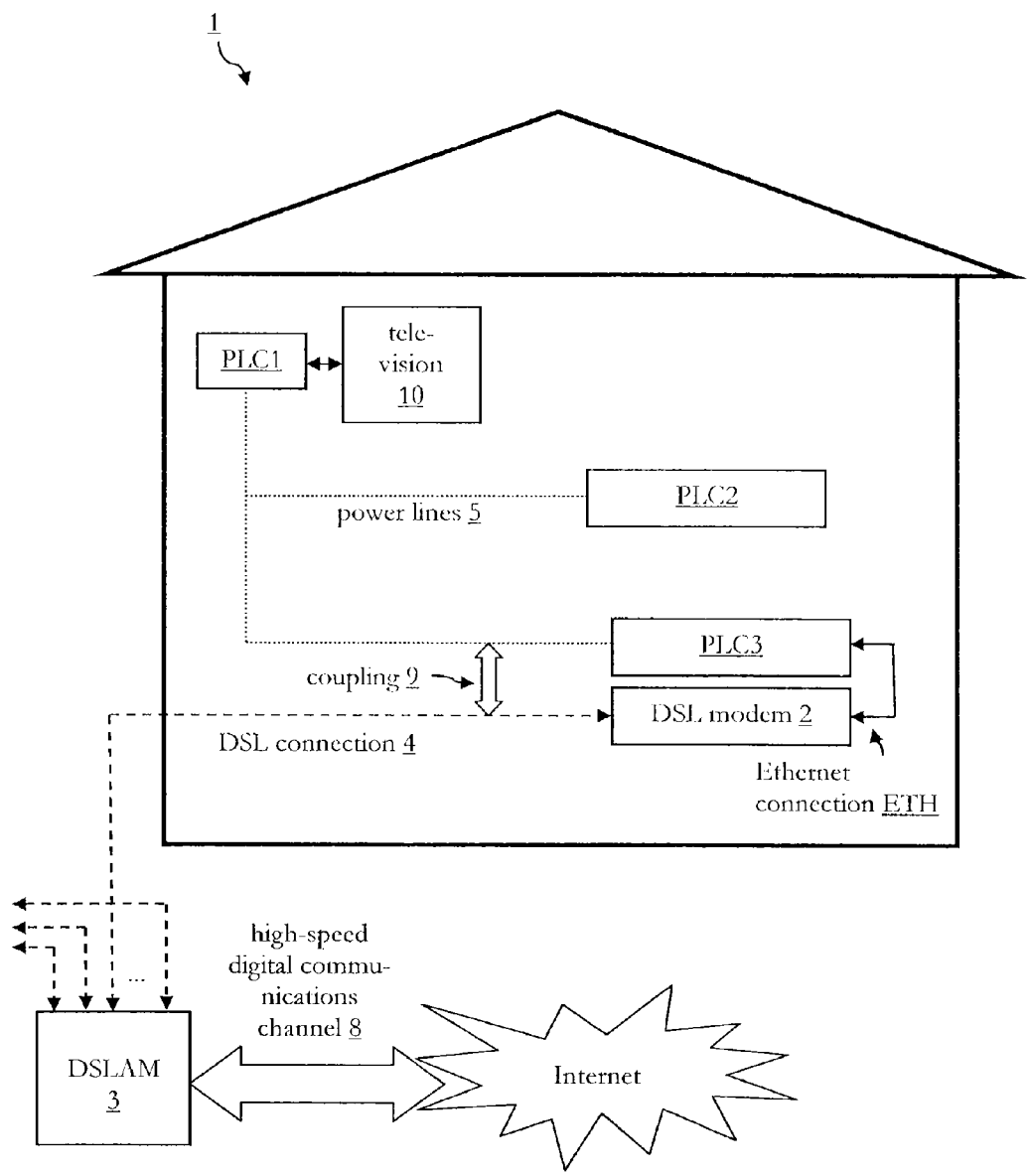
FIG. 1 is a schematic block diagram illustrating crosstalk between a DSL connection and a power line network in a building.

FIG. 1 shows a building 1 in which a DSL modem 2 is located. The DSL modem 2 is connected to a Digital Subscriber Line Access Multiplexer (DSLAM) 3 via a DSL connection 4. The DSLAM 3 is typically located in a telephone exchange of the telecommunications operator. DSLAM 3 connects multiple customer DSL interfaces, e.g. DSL modem 2, to a high-speed digital communications channel 8.

In building 1 there are also located three power line communication (PLC) modems PLC1, PLC2, PLC3. PLC modems PLC1, PLC2, PLC3 are connected to the AC electric power distribution system of building 1. They may for example be directly plugged into power sockets of the power distribution system, or they may for example be integrated within electrical devices which are connected to the power distribution system. PLC modems PLC1, PLC2, PLC3 transmit data on the power lines 5 that are also used simultaneously for AC electric power distribution within building 1. PLC modems PLC1, PLC2, PLC3 and power lines 5 thus define a power line network which provides the function of a local area network (LAN) within building 1. PLC modem PLC3 in the example of FIG. 1 is connected to DSL modem 2 via an Ethernet connection ETH in order to connect the power line network 5 to the high-speed digital communications channel 8. PLC modems PLC1 and PLC2 have Ethernet ports which connect home computers, network storage devices, home entertainment equipment, etc. to the power line network and the high-speed digital communications channel 8. For example, in FIG. 1, PLC1 is connected to an Internet-enabled television set 10.

Power line communications and DSL communications share the same frequencies, typically up to 30 MHz, and a power line 5 can be located near a DSL cable 4. Cables 5 constituting the power line network are typically not balanced and consequently at the frequencies used for data transmission by the PLC modems PLC1, PLC2, PLC3 some radiated emissions may occur. As indicated in FIG. 1 by arrow 9, these radiated emissions from the PLC network 5 may couple to DSL connection 4 and generate an unwanted signal contribution, also referred to as crosstalk or interference, in the input signal received at DSL modem 2. As indicated by arrow 9, crosstalk and interference may also happen vice versa, from DSL connection 4 to the power line network 5.

As an exemplifying scenario it is considered here downloading a video from the Internet via DSL connection 4 and watching this video on television 10. With regard to crosstalk, the following transmission paths are relevant in this example.

DSLAM-to-DSL: When video is downloaded from the Internet, video data is received on the downlink path from DSLAM 3 to DSL modem 2.

PLC3-to-PLC1: In order to display the downloaded video on television 10, video data is transmitted from PLC3 to PLC1.

PLC1-to-PLC3: There is also some reverse data transmission from PLC1 to PLC3 in the context of transmitting video data from PLC3 to PLC1. For example when television 10 acknowledges receipt of the video data, acknowledgements are transmitted from PLC1 to PLC3.

PLC3-to-DSL: When PLC3 transmits, unwanted crosstalk may happen from PLC3 to DSL modem 2. This transmission path may be called "near end crosstalk".

PLC1-to-DSL: When PLC1 transmits, unwanted crosstalk may happen from PLC1 to DSL modem 2. This transmission path may be called "far end crosstalk".

The transmission paths PLC3-to-DSL and PLC1-to-DSL both result in unwanted crosstalk contributions in the signal input to DSL modem 2 via DSL connection. These unwanted crosstalk contributions add to the wanted DSL signal received at DSL modem 2. Other transmissions pathes not mentioned above, e.g. PLC3-to-PLC2, PLC2-to-PLC3, PLC2-to-PLC1, etc. might likewise result in unwanted crosstalk at DSL modem 2.

PLC-to-DSL Crosstalk Estimator

Figure 2:
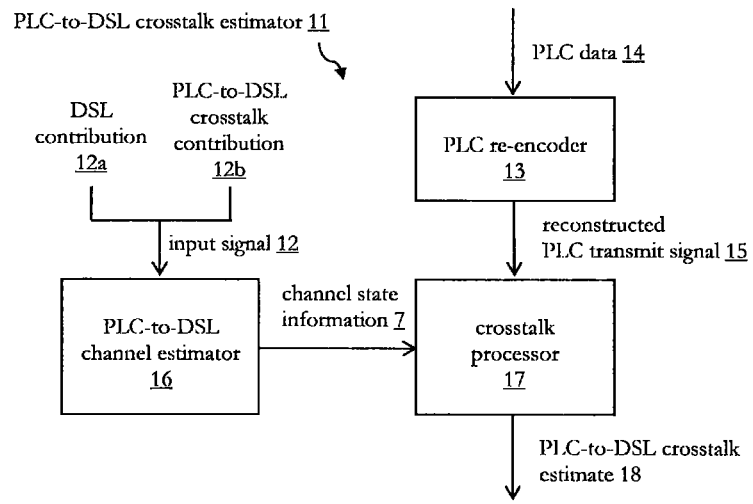
FIG. 2 is a schematic block diagram illustrating a PLC-to-DSL crosstalk estimator according to an embodiment.

In FIG. 2 it is shown an embodiment of a PLC-to-DSL crosstalk estimator 11 for determining an estimate of PLC-to-DSL crosstalk. An input signal 12 comprises a (wanted) DSL contribution 12a and an (unwanted) PLC-to-DSL crosstalk contribution 12b. The DSL contribution 12a may be a DSL signal resulting from the DSLAM-to-DSL transmission path described with regard to FIG. 1 above. The DSL contribution 12a of the input signal 12 may thus be related to video data downloaded from the Internet. The PLC-to-DSL crosstalk contribution 12b of input signal 12 may result from an (unwanted) transmission path such as transmission path PLC1-to-DSL described with regard to FIG. 1 above. Thus, the PLC-to-DSL crosstalk contribution 12b might stem from PLC1 acknowledging receipt of video data on transmission path PLC1-to-PLC3. PLC-to-DSL crosstalk contribution 12b depends on the PLC communication happening on PLC1-to-PLC3 and may vanish during time periods in which there is no PLC transmission on PLC1-to-PLC3.

In order to determine an estimate of the PLC-to-DSL crosstalk contribution 12b in input signal 12, the PLC-to-DSL crosstalk estimator 11 is provided with a PLC re-encoder 13 which is arranged to receive PLC data 14 and to re-encode the received PLC data 14 to obtain a reconstructed PLC transmit signal 15. The PLC data 14 may correspond to the data transmitted by PLC3, i.e. acknowledgment messages as transmitted from television 10 on transmission path PLC1-to-PLC3.

PLC-to-DSL crosstalk estimator 11 is further provided with a PLC-to-DSL channel estimator 16 which is arranged to receive the input signal 12 and to determine channel state information 7 of a PLC-to-DSL channel responsible for a PLC-to-DSL crosstalk contribution 12b in input signal 12.

For example, channel estimator 16 may determine channel state information 7 of the (unwanted) transmission path PLC1-to-DSL responsible for signal contributions from acknowledgements sent by television 10 appearing in input signal 12. Channel state information 7 may e. g. be an impulse response or transfer function of the PLC-to-DSL channel. PLC-to-DSL channel estimator 16 can for example measure the channel transfer function based on known training symbols in the preamble of a PLC communication burst or in a channel estimation procedure. PLC-to-DSL channel estimator 16 may e. g. compare received training symbols with known training symbols to derive the modification by the PLC-to-DSL channel in terms of amplitude and phase of each individual carrier.

PLC-to-DSL crosstalk estimator 11 is further provided with a crosstalk processor 17 which is arranged to determine a PLC-to-DSL crosstalk estimate 18 based on the channel state information 7 received from PLC-to-DSL channel estimator 16 and based on a PLC transmit signal. The PLC transmit signal may for example be the reconstructed PLC transmit signal 15 received from PLC re-encoder 13. In other embodiments, the PLC transmit signal may be obtained from other sources. If the channel state information 7 and the reconstructed PLC transmit signal 15 are represented in the frequency domain, the crosstalk processor 17 may for example multiply a transfer function of the PLC-to-DSL channel obtained by the PLC-to-DSL channel estimator 16 with the reconstructed PLC transmit signal 15 received from PLC re-encoder 13 to obtain the PLC-to-DSL crosstalk estimate 18.

PLC-re-encoder 13, PLC-to-DSL channel estimator 16 and crosstalk processor 17 according to this embodiment can be implemented as integrated circuit logic, for example on a chip.

As PLC-to-DSL channel estimator 16 a channel estimator from a PLC receiver (e.g. PLC receiver 121 of FIG. 11) might be reused. As PLC re-encoder 13, the coding means of a PLC transmitter may be reused.

Figure 3:
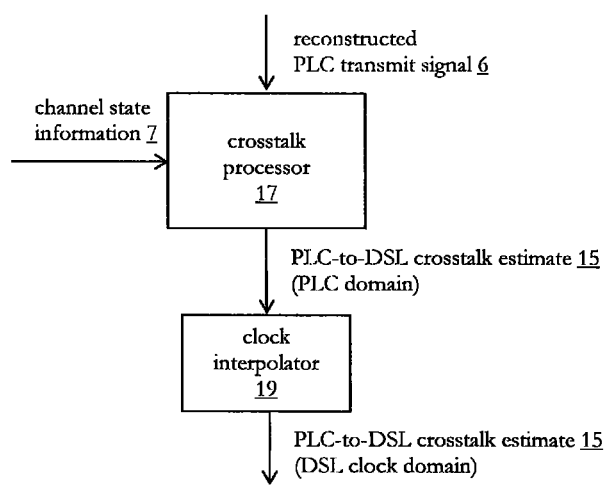
FIG. 3 is a schematic block diagram illustrating a PLC-to-DSL crosstalk estimator according to an embodiment in which the PLC-to-DSL crosstalk estimator comprises a clock interpolator.

FIG. 3 shows a modification of the PLC-to-DSL crosstalk estimator 11 of FIG. 2. The PLC-to-DSL crosstalk estimator of FIG. 3 further comprises a clock interpolator 19 which is arranged to receive the PLC-to-DSL crosstalk estimate 15 from crosstalk processor 17 and to transfer the PLC-to-DSL crosstalk estimate 15 from a PLC clock domain to a DSL clock domain. Typically, each PLC modem transmits with its own clock and a receiving PLC modem adapts itself to the clock of the transmitting modem. The clock used by a transmitting PLC modem, e.g. PLC1 in the above embodiment, may not correspond to the clock used for DSL data reception by a DSL receiver. Clock interpolator 19 thus resamples the PLC-to-DSL crosstalk estimate 15 according to the DSL clock signal. To this end, clock interpolator 19 may receive the DSL clock signal from a DSL decoder (e.g. DSL decoder 21*d* in FIG. 6) and clock interpolator 19 may receive or derive the PLC clock from the received PLC signal to which PLC data 14 corresponds.

Figure 4:
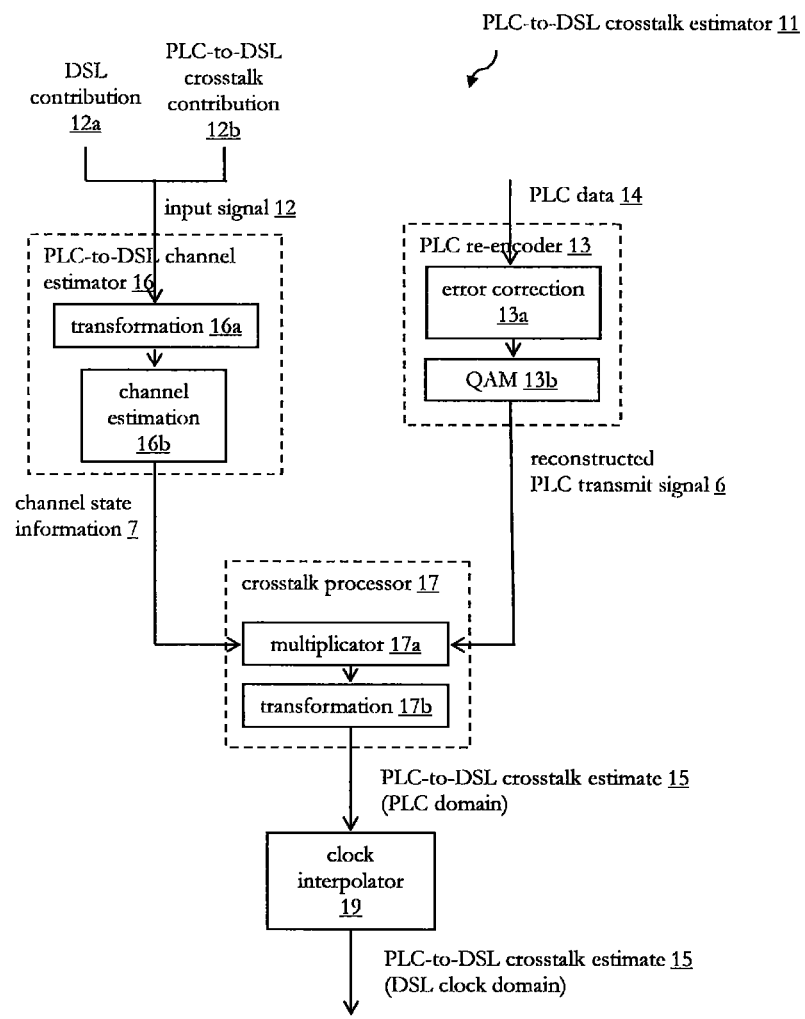
FIG. 4 is a schematic block diagram illustrating in more detail a PLC-to-DSL crosstalk estimator according to an embodiment.

In FIG. 4, the PLC-to-DSL crosstalk estimator 11 of FIGS. 2 and 3 is shown in more detail. PLC re-encoder 13 comprises an error correction unit 13*a* which implements an error correction mechanism. The error correction mechanism to use is defined by the PLC modem which transmitted PLC data 14 based on, for example, channel state information received during channel estimation procedures. The error correction mechanism used in re-encoding may in one embodiment correspond to the coding scheme used by the respective PLC transmitter which transmitted the data. In one embodiment, the error correction unit 13*a* may for example receive the relevant error correction parameters from PLC data 14 when carrier-specific transmission parameters (also called tone map) such as the modulation method used on each carrier, the selection of error correction parameters, or the selection of guard parameters, are negotiated between a transmitting PLC modem and a receiving PLC modem.

PLC re-encoder 13 further comprises a QAM unit 13*b* (QAM=Quadrature Amplitude Modulation) which modulates the PLC data 14 according to defined modulation schemes. QAM unit 13*b* may apply BPSK, QPSK, 8-QAM, 16-QAM, 64-QAM, 256-QAM, 1024-QAM, 4096-QAM or higher modulation schemes for modulating the data. For each carrier an individual modulation scheme may be used. The modulation scheme applied by QAM unit 13*b* should reflect the modulation scheme which was used by the transmitting PLC modem to transmit PLC data 14 within the power line network. As mentioned above, QAM unit 13*b* may receive such information from respective tone maps comprised in PLC data 14.

The reconstructed PLC transmit signal 15 thus obtained by re-encoder 13 resembles the frequency representation of the original PLC transmit signal injected by the transmitting PLC modem (e.g. PLC1 in FIG. 1) into the powerline network when sending PLC data 14.

PLC-to-DSL channel estimator 16 comprises a transformation unit 16*a* which performs a time to frequency transformation of the input signal 12. The transformation unit 16*a* may apply a Fast Fourier Transform (FFT), converting, for each carrier, the input signal 12 into the frequency domain in which a QAM symbol defines amplitude and phase of a respective carrier. Other transformations like for example a wavelet transformation might also be used. According to an embodiment, transformation unit 16*a* may apply Orthogonal Frequency-Division Multiplexing.

PLC-to-DSL channel estimator 16 further comprises a channel estimation unit 16*b* which performs channel estimation e. g. based on PLC training symbols contained in the PLC-to-DSL crosstalk contribution 12*b* of input signal 12. From the PLC training symbols received in input signal 12 and from knowledge about the respective reference training symbols sent by the PLC transmitter, a channel matrix H can be estimated using the combined knowledge of the transmitted and the received signal. Let the training sequence be denoted $p_1, \ldots, p_N$, where the vector $p_i$ is transmitted over the channel as $y_i = Hp_i + n_i$. By combining received training signals $y_i$ for $i=1, \ldots, N$, the total training signaling becomes $Y=[y_i, \ldots, y_N]=HP+N$, with the training matrix $P=[p_1, \ldots, p_N]$ and the noise matrix $N=[n_1, \ldots, n_N]$. Using this notation, channel estimation means that the channel matrix H should be recovered from knowledge of received signals Y and the transmitted training sequence P. If the channel and noise distributions are unknown, then the channel matrix H can be obtained from a least-square estimate as $H_{LS}=YP^\dagger(PP^\dagger)^{-1}$, where $P^\dagger$ denotes the conjugate transpose (Hermitian adjoint) of P. The mean square error of the estimation is proportional to $\text{tr}(PP^\dagger)$, where tr denotes the matrix trace. An example of a training matrix with minimal error is to select P as a scaled identity matrix of the size corresponding to the number of subcarriers used for PLC transmission. If the channel and noise distributions are known, then this a priori information can be exploited by use of Bayesian approaches to decrease the estimation error.

For each PLC transmission, e.g. from PLC1, PLC2 or PLC3 (see FIG. 1), the respective crosstalk channels PLC1-to-DSL, PLC2-to-DSL, PLC3-to-DSL have to be estimated individually. If the channel is not constant over the time, its modifications can be tracked by periodically repeating channel estimation. Usually a PLC channel depends on the AC line cycle so that channel modifications are periodic with and synchronous with AC line cycle. The estimation of the PLC-to-DSL channel might be done e.g. when a DSL modem is not transmitting. To this end, DSL transmissions might be paused for a time so that DSL contribution 12a in input signal 12 is absent. This would allow to estimate the PLC-to-DSL transmission path without DSL interfering signals.

The channel matrix H thus obtained reflects the impulse response or transfer function of the PLC-to-DSL channel and is in one embodiment output to crosstalk processor 17 as channel state information 7 in order to allow estimation of the PLC-to-DSL crosstalk contribution 12a in input signal 12.

According to the depicted embodiment, crosstalk processor 17 comprises a multiplicator unit 17a which applies the channel state information 7 to the reconstructed PLC transmit signal 6 to obtain a PLC-to-DSL crosstalk estimate 15. Multiplicator unit 17a for example applies a transfer function (channel matrix) of the PLC-to-DSL channel, received from PLC-to-DSL channel estimator 16 as channel state information 7, to the reconstructed PLC transmit signal 6 received from PLC re-encoder 13. Let the reconstructed PLC transmit signal 6 be denoted $S=[s_1, \ldots, s_N]$, let $C=[c_1, \ldots, c_N]$ denote the PLC-to-DSL crosstalk estimate 15 and let $H_{LS}$ be the estimated channel matrix received from PLC-to-DSL channel estimator 16. In this notation, the multiplicator unit 17a may calculate the PLC-to-DSL crosstalk estimate 15 as $C=H_{LS}S$, i.e. by multiplying the channel matrix $H_{LS}$ with the matrix S representing the reconstructed PLC transmit signal 6.

Crosstalk processor 17 may further comprise a transformation unit 17b which performs a frequency to time transformation on the PLC-to-DSL crosstalk estimate 15 obtained from multiplicator unit 17a. The transformation unit 17b may apply an Inverse Fast Fourier Transform (IFFT), converting each QAM symbol into a sine wave where the QAM symbol defines amplitude and phase. This may be done for all allocated carriers in parallel to obtain the PLC-to-DSL crosstalk estimate 15 in the time domain. Other transformations like for example a wavelet transformation might also be used. According to an embodiment, transformation unit 17b may apply Orthogonal Frequency-Division Multiplexing.

As in the disclosed embodiment crosstalk processor 17 operates on PLC data, the PLC-to-DSL crosstalk estimate 15 determined by crosstalk processor 17 is sampled according to a PLC clock domain. Typically, each transmitting PLC modem uses its own clock signal for transmitting PLC data on the PLC cannel. In the embodiment of FIG. 4, a clock interpolator 19 is arranged to resample the PLC-to-DSL crosstalk estimate 15 received from crosstalk processor 17 into the DSL clock domain.

The thus obtained PLC-to-DSL crosstalk estimate 15 can be used by a DSL receiver (see FIG. 6) to compensate for the unwanted and unknown PLC-to-DSL crosstalk contribution 12b in input signal 12 which would otherwise deteriorate the wanted DSL contribution 12a in input signal 12.

In the embodiment of FIG. 4, crosstalk processor 17 applies the channel state information 7 to the reconstructed PLC transmit signal 6 in the frequency domain. In an alternative embodiment of the PLC-to-DSL crosstalk estimator, a crosstalk processor might alternatively apply the channel state information 7 to the reconstructed PLC transmit signal 6 in the time domain. In this case, PLC re-encoder would comprise a transformation unit for computing the Inverse Fast Fourier Transform (IFFT) or alternative transformation of the reconstructed PLC transmit signal 6 before passing the reconstructed PLC transmit signal 6 to crosstalk processor. Instead of multiplicator 17a shown in FIG. 4, such a crosstalk processor would comprise a convolution unit for convoluting in the time domain the reconstructed PLC transmit signal 6 with the channel transfer function obtained from PLC-to-DSL channel estimator 16. In this alternative embodiment, the crosstalk processor, instead of performing multiplications in the frequency domain, would perform the processing of convolution integrals. In this case transformation unit 17b shown in the crosstalk processor 17 of FIG. 4 would be omitted.

Transformation unit 16a, channel estimation unit 16b, error correction unit 13a, QAM unit 13b, multiplicator 17a, transformation unit 17b and clock interpolator 19 as described above can be implemented as integrated circuit logic, for example on a chip.

Figure 5:
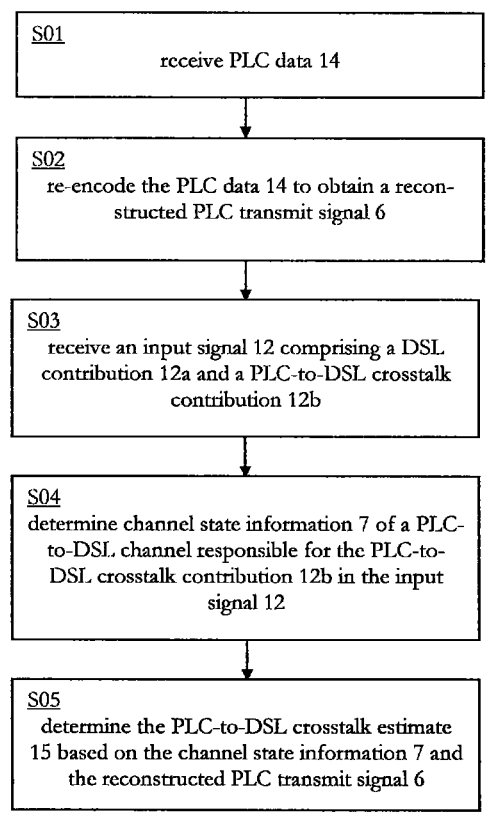
FIG. 5 shows a flowchart of a method for determining a PLC-to-DSL crosstalk estimate according to an embodiment.

FIG. 5 shows a flowchart of a method for determining a PLC-to-DSL crosstalk estimate according to an embodiment. At S01, PLC data 14 is received. At S02, the PLC data 14 is re-encoded to obtain a reconstructed PLC transmit signal 6. At S03, an input signal 12 comprising a DSL contribution 12a and a PLC-to-DSL crosstalk contribution 12b is received. At S04, channel state information 7 of a PLC-to-DSL channel responsible for the PLC-to-DSL crosstalk contribution 12b in the input signal 12 is determined. At S05, the PLC-to-DSL crosstalk estimate 15 is determined based on the channel state information 7 and the reconstructed PLC transmit signal 6. It should be noted that, other than shown in FIG. 5, steps S03 and S04 can also be performed at the same time or earlier than steps S01 and S02.

DSL-Modem with PLC-to-DSL Crosstalk Estimator

Figure 6:
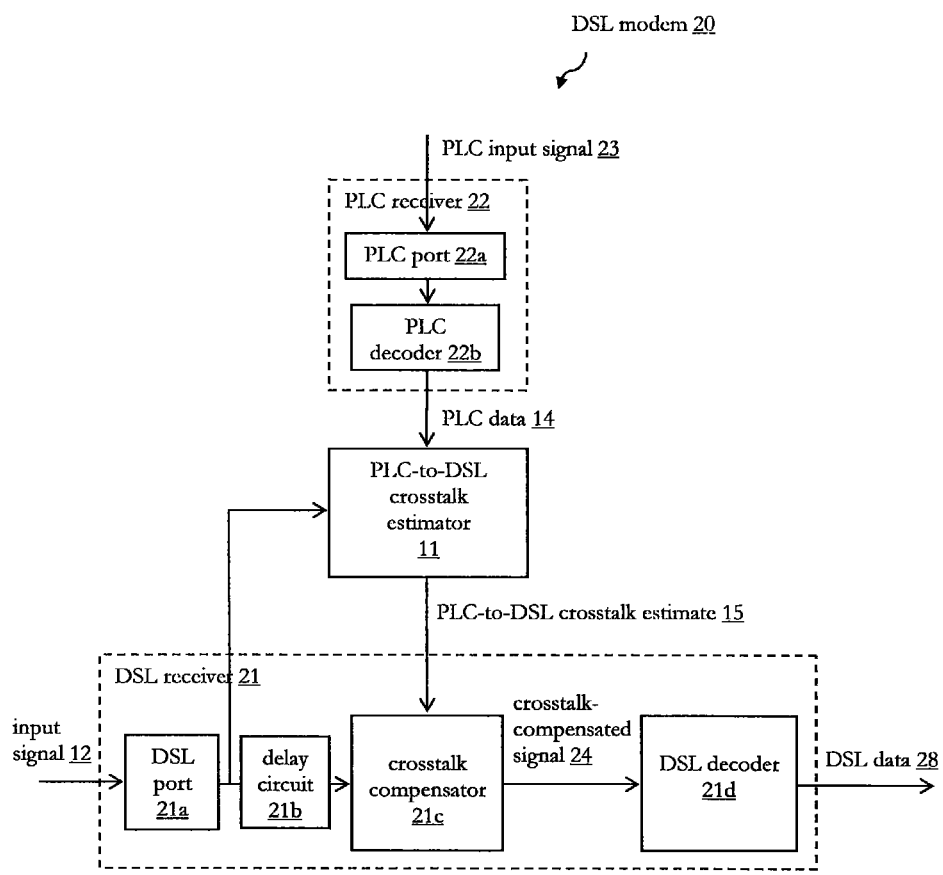
FIG. 6 is a schematic block diagram illustrating a DSL modem according to an embodiment, the DSL modem having a PLC-to-DSL crosstalk estimator.

In FIG. 6 it is shown an embodiment of a DSL device. The DSL device, here DSL modem 20 implements the above described PLC-to-DSL crosstalk estimator 11. The DSL modem 20 comprises a DSL receiver 21 which is arranged to receive an input signal 12 comprising a DSL contribution 12a and a PLC-to-DSL crosstalk contribution 12b related to a PLC-to-DSL transmission path (see FIGS. 2 and 4 for 12a and 12b).

DSL modem 20 further comprises a PLC receiver 22 which is arranged to receive a PLC input signal 23 and to decode the received PLC input signal 23 to obtain PLC data 14 corresponding to the received PLC input signal 23. According to the embodiment of FIG. 6, PLC receiver 22 comprises a PLC port 22a which is arranged to receive the PLC input signal 23 and a PLC decoder 22b arranged to decode the received PLC input signal 23 to obtain PLC data 14.

DSL modem 20 further comprises a PLC-to-DSL crosstalk estimator 11 for determining a PLC-to-DSL crosstalk estimate 15 from the PLC data 14 and from the input signal 12 comprising the PLC-to-DSL crosstalk contribution 12b. This PLC-to-DSL crosstalk estimator 11 may be realized as described with regard to the embodiments of FIGS. 2, 3 and 4 above.

A clock interpolator 19 of PLC-to-DSL crosstalk estimator 11 may in one embodiment obtain the PLC clock from PLC input signal 23 and may obtain the DSL clock from DSL decoder 21d. Alternatively, clock interpolator 19 might receive the PLC clock from PLC-to-DSL channel estimator 16. As there might be an individual clock for each transmitting PLC modem the clock may be derived out of PLC input signal 23 or PLC-to-DSL crosstalk contribution 12b at every PLC burst transmission.

The DSL receiver 21 according to this embodiment comprises a DSL port 21a which is arranged to receive an input signal 12 comprising a DSL contribution 12a and a PLC-to-DSL contribution 12b.

The DSL receiver 21 may further comprise a delay circuit 21b which is arranged to receive the input signal 12 from DSL port 21a and to delay the input signal 12 to compensate for a delay of the PLC-to-DSL crosstalk estimate 15 with respect to the PLC-to-DSL crosstalk contribution 12b in input signal 12. This delay circuit 21b may be implemented in the case that a delay caused by the PLC-to-DSL crosstalk estimator 11 has to be compensated for. If a delay is not present or negligible, then delay circuit 21b can be omitted.

The DSL receiver 21 further comprises a crosstalk compensator 21c which is arranged to receive the delayed input signal 12 from delay circuit 21b and to determine a crosstalk-compensated signal 24 based on the delayed input signal 12 and the PLC-to-DSL crosstalk estimate 15 received from the PLC-to-DSL crosstalk estimator 11. For example, crosstalk compensator 21c may subtract PLC-to-DSL crosstalk estimate 15 from input signal 12 to obtain the crosstalk-compensated signal 24. Using the notation as defined with regard to the channel estimation process above, let $S=[s_1, \ldots, s_N]$ denote the reconstructed PLC transmit signal 6, let $C=[c_1, \ldots c_N]=H_{LS}S$ denote the PLC-to-DSL crosstalk estimate 15, with $H_{LS}$ being the estimated channel matrix, and let $D=[d_1, \ldots, d_N]$ denote the delayed input signal 12. In this notation the crosstalk-compensated signal 24 obtained by subtraction, denoted as D', is $D'=D-H_{LS}S$.

The DSL receiver 21 further comprises a DSL decoder 21d which is arranged to determine DSL data 28 from the crosstalk-compensated DSL signal 25 received from crosstalk compensator 24. The DSL data 28 determined by DSL decoder 21d might be forwarded via an external Ethernet connector to other devices. Alternatively, the DSL data 28 might be routed to a PLC transmitter which may optionally be arranged in DSL modem 20.

As PLC-to-DSL channel estimator 16 in PLC-to-DSL crosstalk estimator 11, a channel estimator from PLC receiver 22 might be reused.

Embodiments of PLC port 22a, DSL port 21a, PLC decoder 22b, and DSL decoder 21d are described with regard to FIGS. 7a, 7b, 7c, and 7d.

Figure 7A:
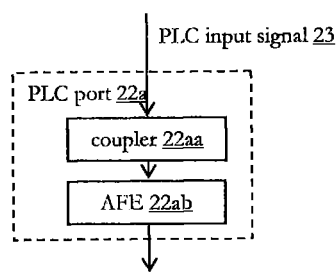
FIGS. 7a, 7b, 7c, and 7d are schematic block diagrams illustrating a PLC port, a DSL port, a PLC decoder, and a DSL decoder.

FIG. 7a shows an embodiment of PLC port 22a. PLC port 22a comprises a coupler 22aa which couples to the power line cable carrying PLC input signal 23. The PLC input signal 23 is passed to an Analog Frontend (AFE) 22ab in which the PLC input signal 23 is transformed into digital form. The thus obtained PLC input signal 23 can for example be passed from PLC port 22a to PLC decoder 22b as shown in FIG. 6.

Figure 7B:
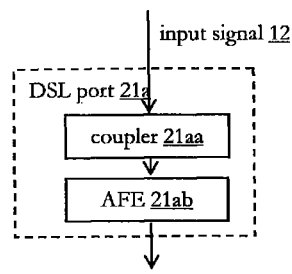

In FIG. 7b it is shown an embodiment of DSL port 21a. DSL port 21a comprises a coupler 21aa which couples to the cable carrying input signal 12. This cable may be a DSL connection like the one shown in FIG. 1 (reference sign 4). The input signal 12 is passed to an Analog Frontend (AFE) 21ab in which the input signal 12 is transformed into digital form. The thus obtained input signal 23 can for example be passed from DSL port 21a to delay circuit 21b as shown in FIG. 6.

Figure 7C:
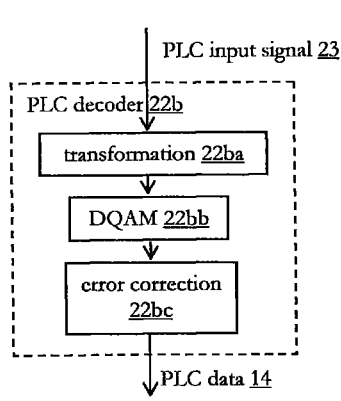

FIG. 7c shows an embodiment of PLC decoder 22b. PLC decoder 22b receives the PLC input signal 23 from PLC port 22a. PLC decoder 22b comprises a transformation unit 22ba which for example FFT-transforms the received PLC input signal 23 into the frequency domain. Other transformations like for example a wavelet transformation might also be used. According to an embodiment, transformation unit 22ba may apply Orthogonal Frequency-Division Multiplexing. PLC decoder 22b further comprises a DQAM unit 22bb which demodulates PLC input signal 23 according the modulation schemes which have been applied to the PLC input signal 23 by the PLC modem which transmitted the signal PLC decoder 22b further comprises an error correction unit 22bc which applies error correction to the demodulated input signal to thus obtain PLC data 14 corresponding to PLC input signal 23.

Figure 7D:
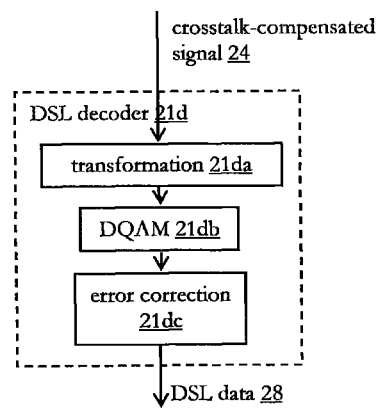

FIG. 7d shows an embodiment of DSL decoder 21d. DSL decoder 21d receives the crosstalk-compensated signal 24 from crosstalk compensator 21c. DSL decoder 21d comprises a transformation unit 21da which for example FFT-transforms the crosstalk-compensated signal 24 into the frequency domain. Other transformations like for example a wavelet transformation might also be used. According to an embodiment, transformation unit 21da may apply Orthogonal Frequency-Division Multiplexing. DSL decoder 21d further comprises a DQAM unit 21db which demodulates crosstalk-compensated signal 24 according the modulation schemes which have been applied to the DSL contribution 12a of input signal 12 by the DSL transmitter (e.g. DSLAM of FIG. 1) which transmitted the DSL contribution 12a of input signal 12. DSL decoder 21d further comprises an error correction unit 21dc which applies error correction to the demodulated crosstalk-compensated signal 24 to thus obtain DSL data 28 corresponding to the DSL contribution 12a of input signal 12.

AFE unit 22ab, AFE unit 21ab, transformation unit 22ba, transformation unit 21da, DQAM unit 22bb, DQAM unit 21db, error correction unit 22bc and error correction unit 21dc described above can be implemented as a integrated circuit logic, for example on a chip. Coupler 22aa and coupler 21aa are standard units available to the skilled person.

Figure 8:
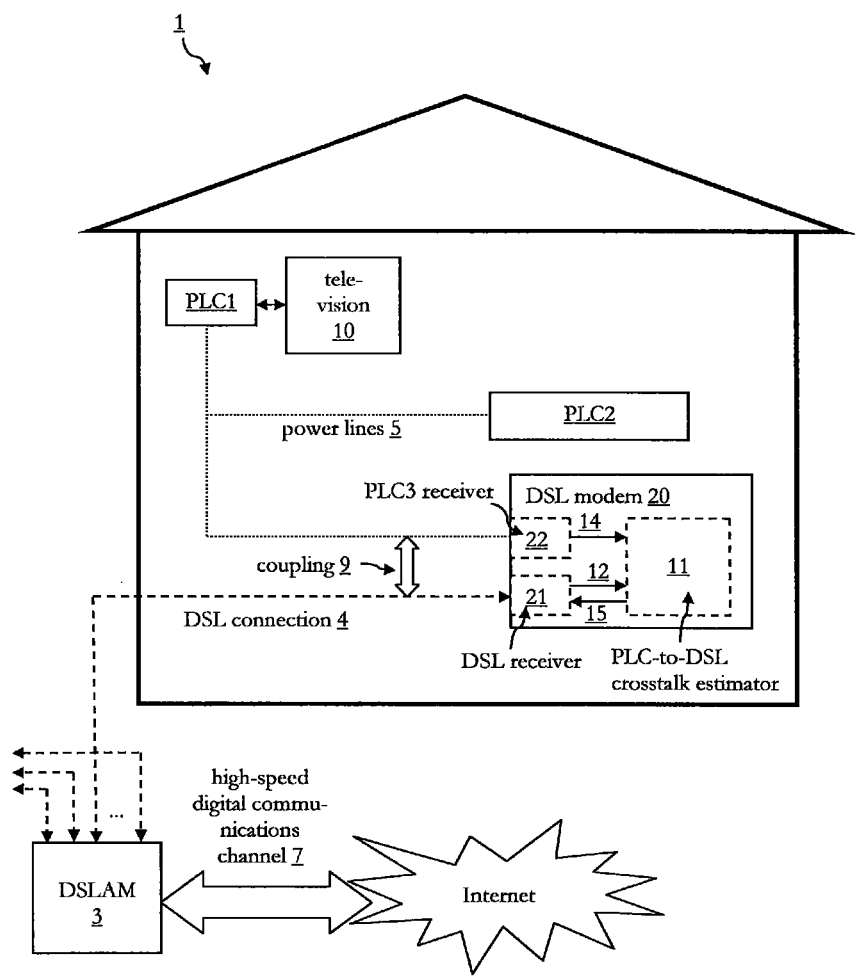
FIG. 8 is a schematic block diagram illustrating crosstalk between a DSL connection and a power line network in a building; the building is equipped with a DSL modem which comprises a PLC-to-DSL crosstalk estimator according to the embodiments.

FIG. 8 shows a building 1 in which a DSL modem 20 as described in the embodiments above is located. Those elements of FIG. 8 which are labeled with the same reference numbers as respective elements in FIG. 1 are identical and the above description of them applies. DSL modem 20 comprises a DSL receiver 21, a PLC receiver 22, and a PLC-to-DSL crosstalk estimator 11. PLC receiver 22 outputs PLC data 14 to PLC-to-DSL crosstalk estimator 11. DSL receiver 21 outputs an input signal 12 to PLC-to-DSL crosstalk estimator 11. From the received data, PLC-to-DSL crosstalk estimator 11 determines a PLC-to-DSL crosstalk estimate 15 which it returns to DSL receiver 21. DSL receiver 21 comprises a crosstalk compensator 21c (see FIG. 6) which determines a crosstalk-compensated signal 24 based on the PLC-to-DSL crosstalk estimate 15, and DSL receiver 21 further comprises a DSL decoder (see FIG. 6) for determining DSL data 28 from the crosstalk-compensated signal 24. This DSL data 28 may be output by DSL modem 20 through an Ethernet port.

DSL+PLC Modem

In an alternative embodiment, DSL modem 20 may be further equipped with a PLC transmitter. DSL modem 20 may also comprise a DSL transmitter for transmitting DSL data to DSLAM 3 (see FIG. 1). Such a modem implements the functionality of a conventional PLC modem and the functionality of a conventional DSL modem and may thus be called a dual DSL+PLC modem which features PLC-to-DSL crosstalk compensation. PLC transmitters contain coding means which can be reused by PLC-to-DSL crosstalk estimator as PLC re-encoder. Likewise, DSL transmitters contain coding means which can be reused by a DSL-to-PLC crosstalk estimator as DSL re-encoder.

In FIG. 8 a DSL modem 20 as described in the embodiments is located in a household (building 1). Crosstalk compensation may however also be applied in the uplink path to DSLAM 3. For example, crosstalk might happen between the PLC transmitter and the DSL transmitter of the DSL+PLC modem. Such crosstalk may be compensated by estimating the crosstalk channel from the PLC port to the DSL port of the DSL+PLC modem and using the obtained channel state information to compensate for the crosstalk according to the same principles as described in the embodiments above.

DSL-to-PLC Crosstalk Estimator

Figure 9:
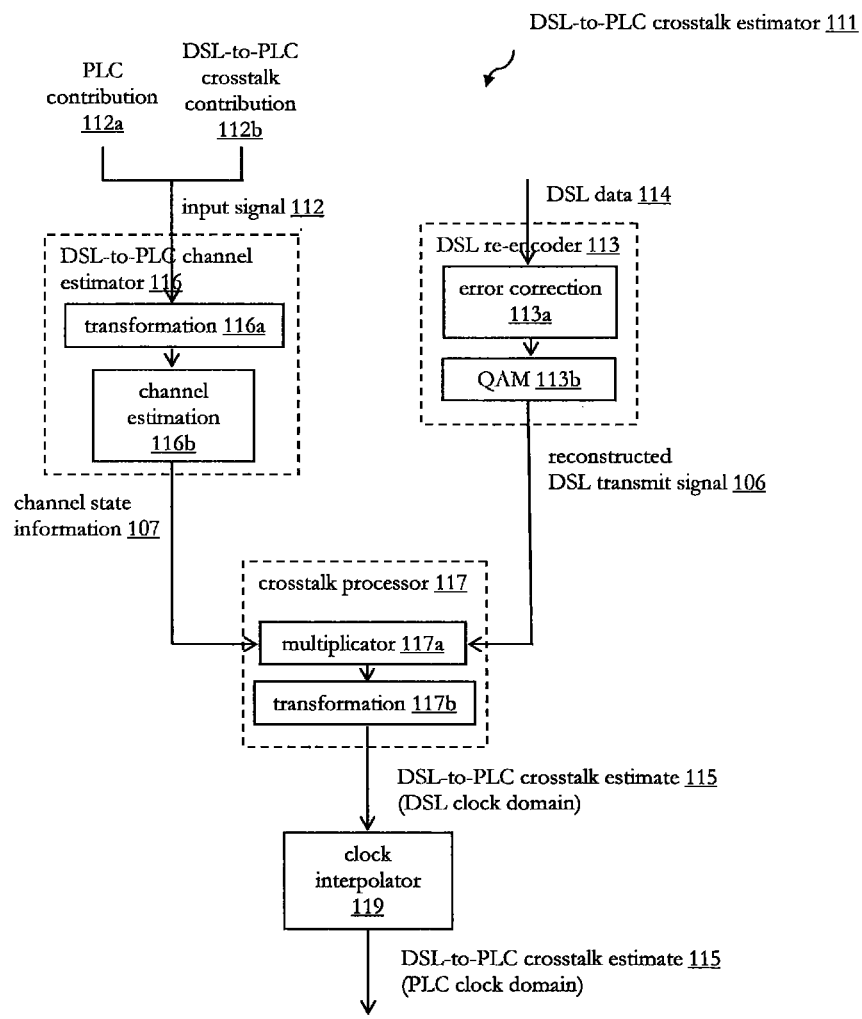
FIG. 9 is a schematic block diagram illustrating a DSL-to-PLC crosstalk estimator according to an embodiment.

In FIG. 9 it is shown a DSL-to-PLC crosstalk estimator 111 for determining a DSL-to-PLC crosstalk estimate 115. The DSL-to-PLC crosstalk estimator 111 comprises a DSL re-encoder 113 arranged to receive DSL data 114 and to re-encode the received DSL data 114 to obtain a reconstructed DSL transmit signal 106. DSL-to-PLC crosstalk estimator 111 further comprises a DSL-to-PLC channel estimator 116 arranged to receive an input signal 112 comprising a PLC contribution 112a and a DSL-to-PLC crosstalk contribution 112b, and arranged to determine channel state information 107 of a DSL-to-PLC channel responsible for the DSL-to-PLC crosstalk contribution 112b in the input signal 112. DSL-to-PLC crosstalk estimator 111 further comprises a crosstalk processor 117 arranged to determine the DSL-to-PLC crosstalk estimate 115 based on the channel state information 107 and a DSL transmit signal 106. The DSL transmit signal 106 may for example be the reconstructed DSL transmit signal 106 received from DSL re-encoder 113. In alternative embodiments, the DSL transmit signal may be received from other sources. In an embodiment, DSL-to-PLC channel estimator 116 comprises a transformation unit 116a and a channel estimation unit 116b. DSL re-encoder 113 comprises an error correction unit 113a and a QAM 113b. Crosstalk processor 117 comprises a multiplicator unit 117a and a transformation unit 117b. A clock interpolator 119 is arranged to resample the DSL-to-PLC crosstalk estimate 115 from the DSL clock domain to the PLC clock domain. The functionality of these elements corresponds to that described with regard to the embodiment of the PLC-to-DLC crosstalk estimator 11 described with regard to FIGS. 2, 3, and 4, however applying the respective functionality in the PLC domain instead of the DSL domain, or vice versa, respectively.

Figure 10:
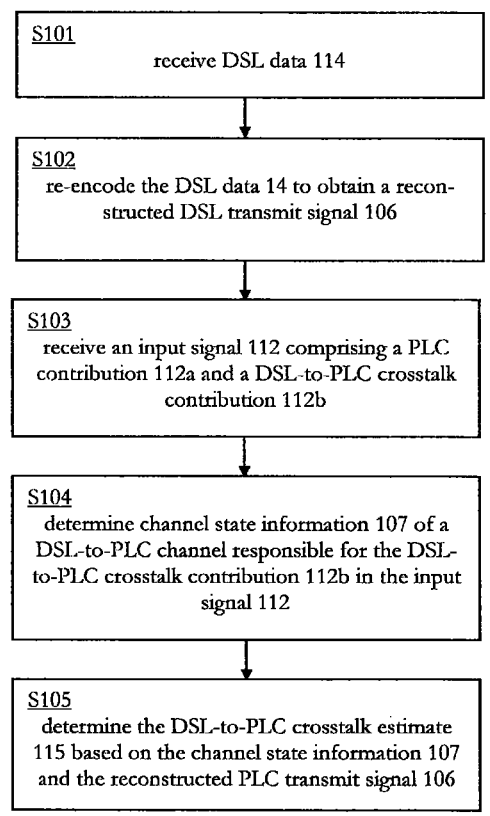
FIG. 10 shows a flowchart of a method for determining a DSL-to-PLC crosstalk estimate according to an embodiment.

FIG. 10 shows a flowchart of a method for determining a DSL-to-PLC crosstalk estimate according to an embodiment. At S101, DSL data 114 is received. At S102, the DSL data 114 is re-encoded to obtain a reconstructed DSL transmit signal 106. At S103, an input signal 112 comprising a PLC contribution 112a and a DSL-to-PLC crosstalk contribution 112b is received. At S104, channel state information 107 of a DSL-to-PLC channel responsible for the DSL-to-PLC crosstalk contribution 112b in the input signal 112 is determined. At S105, the DSL-to-PLC crosstalk estimate 115 is determined based on the channel state information 107 and the reconstructed DSL transmit signal 106. It should be noted that, other than shown in FIG. 10, steps S103 and S104 can also be performed at the same time or earlier than steps S101 and S102.

PLC-Modem with DSL-to-PLC Crosstalk Estimator

Figure 11:
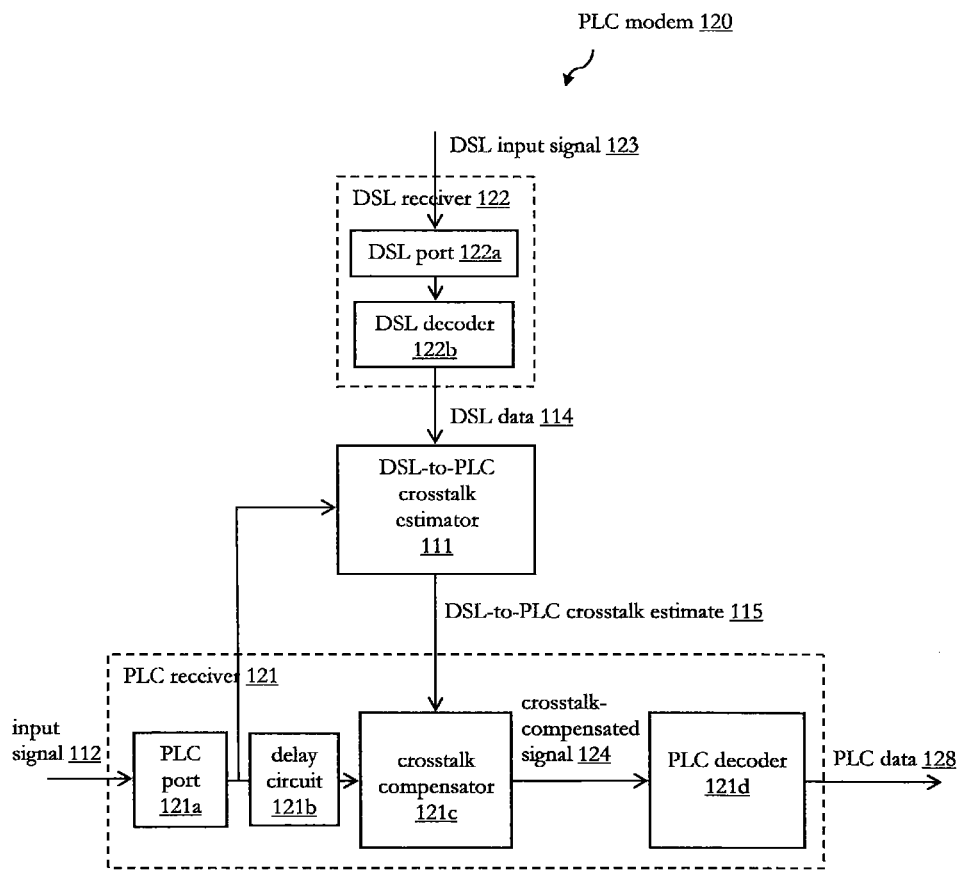
FIG. 11 is a schematic block diagram illustrating a PLC modem according to an embodiment, the PLC modem having a DSL-to-PLC crosstalk estimator.

In FIG. 11 it is shown an embodiment of a PLC device. The PLC device, here PLC modem 120 implements the DSL-to-PLC crosstalk estimator 111 described above. PLC modem 120 comprises a PLC receiver 121 arranged to receive an input signal 112 comprising a PLC contribution 112a and a DSL-to-PLC crosstalk contribution 112b. PLC modem 120 further comprises a DSL receiver 122 arranged to receive a DSL input signal 123 and to decode the received DSL input signal 123 to obtain DSL data 114 corresponding to the received DSL input signal 123. PLC modem 120 further comprises a DSL-to-PLC crosstalk estimator 111, the DSL-to-PLC crosstalk estimator 111 determining a DSL-to-PLC crosstalk estimate 115 from the DSL data 114 and the input signal 112 comprising the DSL-to-PLC crosstalk contribution 112b. PLC receiver 121 comprises a crosstalk compensator 121c arranged to determine a crosstalk-compensated signal 124 based on the received input signal 112 and the DSL-to-PLC crosstalk contribution 115 determined by and received from the DSL-to-PLC crosstalk estimator 111. PLC receiver 121 further comprises a PLC decoder 121d arranged to obtain PLC data 128 from the crosstalk-compensated signal 124 received from the crosstalk compensator 111. The PLC receiver 121 may optionally further comprise a delay circuit 121b arranged to delay the received input signal 112 to compensate for a delay of the DSL-to-PLC crosstalk estimate 115 received from the DSL-to-PLC crosstalk estimator 111 with respect to the DSL-to-PLC crosstalk contribution 112b in the input signal 112. The functionality of the elements of FIG. 11 corresponds to that described with regard to the embodiment of the DSL modem 20 of FIGS. 4 and 6 above, however applying the respective functionality in the PLC domain instead of the DSL domain, or vice versa, respectively.

DSL-Modem with Correlator

Figure 12:
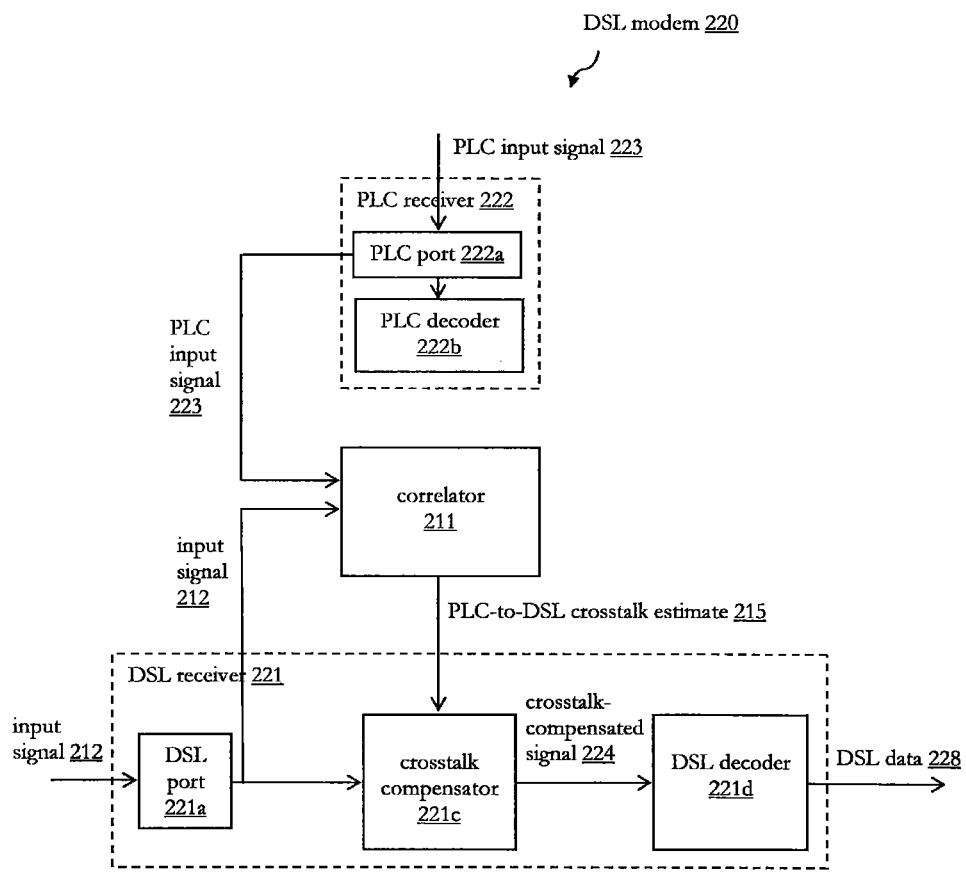
FIG. 12 is a schematic block diagram illustrating a DSL modem according to an embodiment, the DSL modem having a correlator to determine a PLC-to-DSL crosstalk estimate.

In FIG. 12 it is shown a further embodiment of a DSL device. DSL modem 220 comprises a DSL receiver 221 arranged to receive an input signal 212 comprising a DSL contribution 212a and a PLC-to-DSL crosstalk contribution 212b. The DSL modem 220 further comprises a PLC receiver 222 arranged to receive a PLC input signal 223. The DSL modem 220 further comprises a correlator 211 which is arranged to determine a PLC-to-DSL crosstalk estimate 215 from the PLC input signal 223 and the input signal 212 comprising the PLC-to-DSL crosstalk contribution 212b. The correlator 211 may compute the cross-correlation function of the PLC input signal 223 and the input signal 212 comprising the PLC-to-DSL crosstalk contribution 212b. Let x(n) denote PLC input signal 223 and y(n) denote input signal 212 at respective sample points n. In this notation the cross-correlation function z(d) which can be used as PLC-to-DSL crosstalk contribution 212b is described as $$z(d)=\sum_{n=0}^{L-1}x(n)y^*(n-d),$$

where d is a sample point of the cross-correlation function and L is the total number of sample points. Assuming that the PLC-to-DSL crosstalk contribution 212b in input signal y(n) is not delayed with respect to the PLC input signal 223, x(n), then the cross-correlation is expected to have its maximum z(0) at d=0. z(0) can thus be called the correlation grade. The correlator 211 may determine the PLC-to-DSL crosstalk estimate 215 by multiplying PLC input signal 223, x(n), with the obtained correlation grade z(0) and with a predetermined scaling factor f which can be obtained by training the correlator in advance with a test input signal 212 of which the contributions 212a and 212b are known. In the notation used above, the PLC-to-DSL crosstalk estimate 215, denoted as e(n), would thus read e(n)=f z(0) x(n).

Correlator 211 may also define a threshold value $z_{th}$ and compare the obtained correlation grade z(0) with threshold value $z_{th}$ to decide whether or not PLC-to-DSL crosstalk cancellation is necessary or not. Correlator 211 may decide that no crosstalk cancellation is necessary if $z(0)<z_{th}$, and thus set e(n) to zero. Otherwise, i.e. if $z(0) \geq z_{th}$, correlator 211 may decide that crosstalk cancellation is necessary and determine the PLC-to-DSL crosstalk estimate 215 to e(n)=f z(0) x(n).

The DSL receiver 221 further comprises a crosstalk compensator 221c arranged to determine a crosstalk-compensated signal 224 based on the received input signal 212 and the PLC-to-DSL crosstalk estimate 215 determined by and received from the correlator 211. The crosstalk compensator 221c may subtract PLC-to-DSL crosstalk estimate 215 from input signal 212 to obtain the crosstalk-compensated signal 224.

The DSL receiver 221 of FIG. 12 further comprises a DSL decoder 221d arranged to obtain DSL data 228 from the crosstalk-compensated signal 224 received from the crosstalk compensator 221c. As shown in FIG. 12, the DSL receiver 221 may also comprise a DSL port 221a which is arranged to receive the input signal 212.

In FIG. 12 also a PCL decoder 222b is shown as part of PLC receiver 222. This PCL decoder 222b may be used to decode PLC input signal 223. However, as the decoded PLC data is not used for crosstalk compensation, PLC decoder 222b can be omitted.

Figure 13:
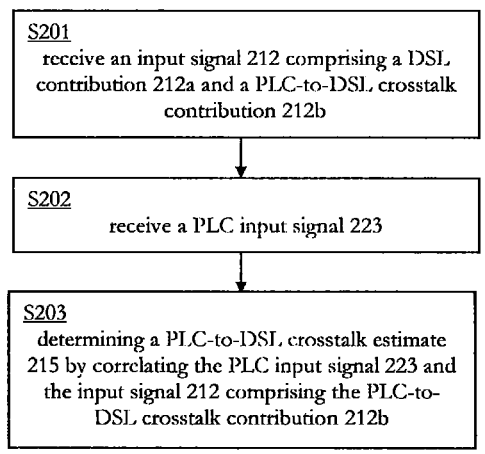
FIG. 13 shows a flowchart of a method for determining a PLC-to-DSL crosstalk estimate according to an embodiment, the method being based on correlation.

FIG. 13 shows a flowchart of a method for determining a PLC-to-DSL crosstalk estimate. At S201, an input signal 212 comprising a DSL contribution 212a and a PLC-to-DSL crosstalk contribution 212b is received. At S202, a PLC input signal 223 is received. At S203, a PLC-to-DSL crosstalk estimate 215 is determined by correlating the PLC input signal 223 and the input signal 212 comprising the PLC-to-DSL crosstalk contribution 212b. It should be noted that, other than shown in FIG. 13, step S202 may also be performed at the same time or earlier than step S201.

PLC-Modem with Correlator

Figure 14:
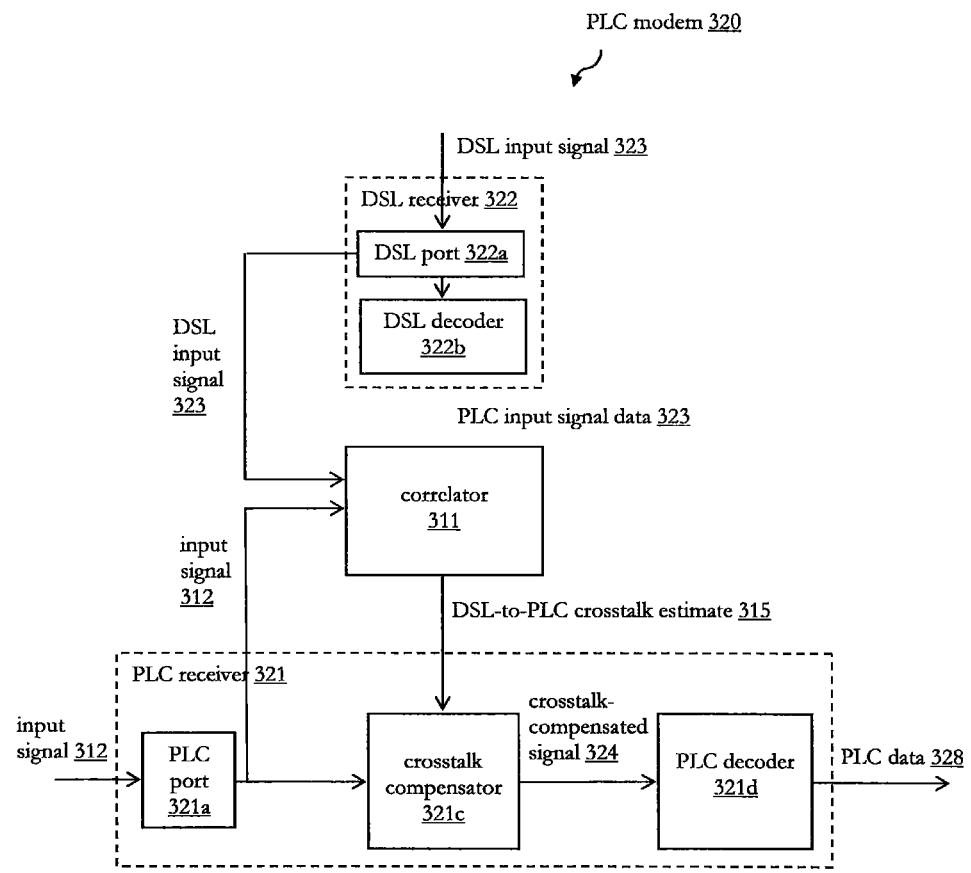
FIG. 14 is a schematic block diagram illustrating a PLC modem according to an embodiment, the PLC modem having a correlator to determine a DSL-to-PLC crosstalk estimate.

In FIG. 14 it is shown a further embodiment of a PLC device. PLC modem 320 comprises a PLC receiver 321 arranged to receive an input signal 312 comprising a PLC contribution 312a and a DSL-to-PLC crosstalk contribution 312b. The PLC modem 320 further comprises a DSL receiver 322 arranged to receive a DSL input signal 323. The PLC modem 320 further comprises a correlator 311 which is arranged to determine a DSL-to-PLC crosstalk estimate 315 from the DSL input signal 323 and the input signal 312 comprising the DSL-to-PLC crosstalk contribution 312b. The PLC receiver 321 comprises a crosstalk compensator 321c arranged to determine a crosstalk-compensated signal 324 based on the received input signal 312 and the DSL-to-PLC crosstalk estimate 315 determined by and received from the correlator 311. The PLC receiver 321 of FIG. 14 further comprises a PLC decoder 321d arranged to obtain PLC data 328 from the crosstalk-compensated signal 324 received from the crosstalk compensator 321c.

PLC receiver 321 may also comprise a PLC port 321a which is arranged to receive the input signal 312. In FIG. 14 also a DSL decoder 322b is shown as part of DSL receiver 322. This DSL decoder 322b may be used to decode DSL input signal 323. However, as the decoded DSL data is not used for crosstalk compensation, DSL decoder 322b can be omitted. Correlator 311 and crosstalk compensator 321c of FIG. 14 may operate in the same way as described with regard to the embodiment of FIG. 12, however using the DSL input signal 323 instead of PLC input signal 223.

Figure 15:
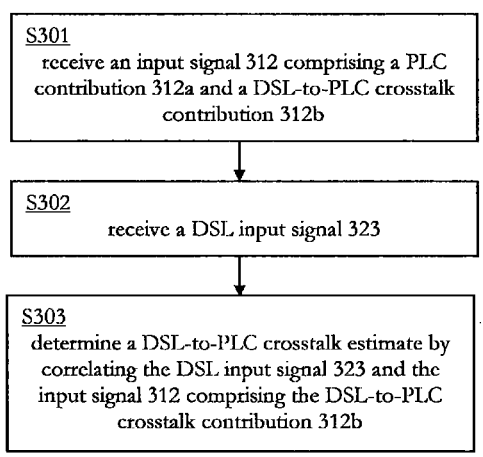
FIG. 15 shows a flowchart of a method for determining a DSL-to-PLC crosstalk estimate according to an embodiment, the method being based on correlation.

FIG. 15 shows a flowchart of a method for determining a DSL-to-PLC crosstalk estimate. At S301, an input signal 312 comprising a DSL contribution 312a and a DSL-to-PLC crosstalk contribution 312b is received. At S302, a DSL input signal 323 is received. At S303, a DSL-to-PLC crosstalk estimate 315 is determined by correlating the DSL input signal 323 and the input signal 312 comprising the DSL-to-PLC crosstalk contribution 312b. It should be noted that, other than shown in FIG. 15, step S302 can also be performed at the same time or earlier than step S301.

Radio-to-PLC Crosstalk Estimator

PLC and DSL communications may also experience interference from narrowband HF radio broadcast. HF signals from narrowband HF radio may ingress into the telecommunications or power lines. Amplitude modulated (AM) HF radio transmissions have in frequency domain a dominant carrier and two AM side-bands. A PLC or DSL receiver may embed an AM demodulator including automatic gain control (AGC) and automatic frequency control (AFC) to follow the variations of the sine carrier. AM signals might also be demodulated. The reconstructed sinusodial wave and the modulated audio signal can be subtracted from PLC or DSL signals.

Figure 16:
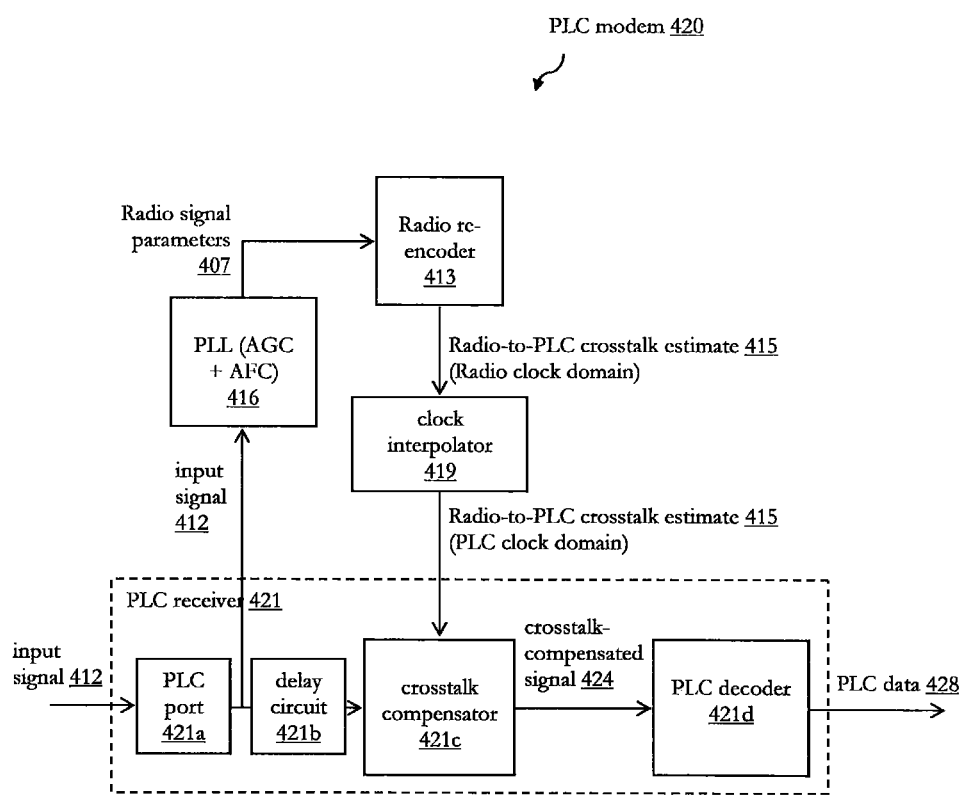
FIG. 16 is a schematic block diagram illustrating a PLC modem according to an embodiment, the PLC modem having a Radio re-encoder to determine a Radio-to-PLC crosstalk estimate.

FIG. 16 shows a further embodiment of a PLC device. PLC modem 420 comprises a PLC receiver 421 arranged to receive an input signal 412 comprising a PLC contribution 412a and a Radio-to-PLC crosstalk contribution 412b. The PLC modem 420 further comprises a Phase Locked Loop unit 416 which may apply Automatic Gain Control (AGC) and Automatic Frequency Control (AFC) to the input signal. Phase Locked Loop unit 416 is arranged to lock to the frequency of a radio channel found in input signal 412 which is responsible for Radio-to-PLC crosstalk contribution 412b. Phase Locked Loop unit 416 determines Radio signal parameters 407 such as gain and frequency of a radio channel found in input signal 412. Phase Locked Loop unit 416 passes the determined Radio signal parameters 407 on to Radio re-encoder 413. Radio re-encoder 413 uses the obtained Radio signal parameters 407 to reconstruct a Radio signal corresponding to the Radio signal parameters 407. Radio re-encoder 413 outputs the reconstructed Radio signal as a Radio-to-PLC crosstalk estimate 415 to clock interpolator 419 which transforms the Radio-to-PLC crosstalk estimate 415 from the Radio clock domain to the PLC clock domain. In embodiments where clock interpolation is not necessary, clock interpolator 419 may also be omitted. PLC receiver 421 comprises a crosstalk compensator 421c which receives the Radio-to-PLC crosstalk estimate 415 from clock interpolator 419 and which subtracts the Radio-to-PLC crosstalk estimate 415 from input signal 412 to obtain a crosstalk-compensated signal 424. PLC decoder 421d decodes the crosstalk-compensated signal 424 to obtain PLC data 428. A delay circuit 421b is arranged to compensate for any delay caused by Radio re-encoder 413 and Phase Locked Loop 416. In embodiments where there is no delay or delay is negligible, delay circuit 421b may also be omitted. The delay applied by delay circuit 421b may be a predetermined delay which is determined in advance from knowledge about the delays appearing in Radio re-encoder 413 and Phase Locked Loop 416.

In addition to Phase Locked Loop unit 416 an AM signal demodulator might be used to demodulate the AM signal and to use the demodulated AM signal in determining the Radio-to-PLC crosstalk estimate 415.

In an alternative embodiment, the identification of a radio signal as described above may happen for two or more radio channels in parallel. The PLC modem may comprise more than one Phase Locked Loop unit, wherein each one may tune to a different radio channel.

Figure 17:
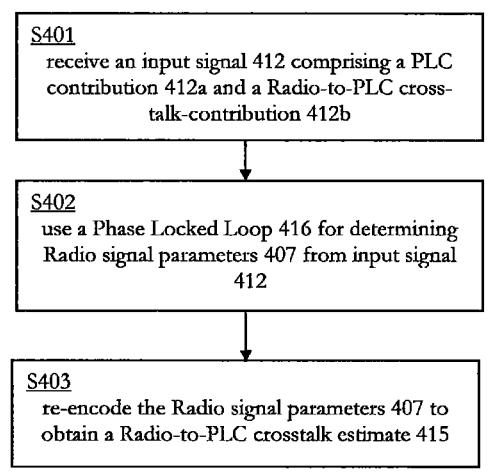
FIG. 17 shows a flowchart of a method for determining a Radio-to-PLC crosstalk estimate according to an embodiment.

FIG. 17 shows a flowchart of a method for determining a Radio-to-PLC crosstalk estimate according to an embodiment. At S401 an input signal 412 comprising a PLC contribution 412a and a Radio-to-PLC crosstalk contribution 412b is received. At S402 a Phase Locked Loop 416 is used for determining Radio signal parameters 407 from the input signal 412. At S403, the Radio signal parameters 407 are re-encoded to obtain a Radio-to-PLC crosstalk estimate 415.

Radio-to-DSL Crosstalk Estimator

Figure 18:
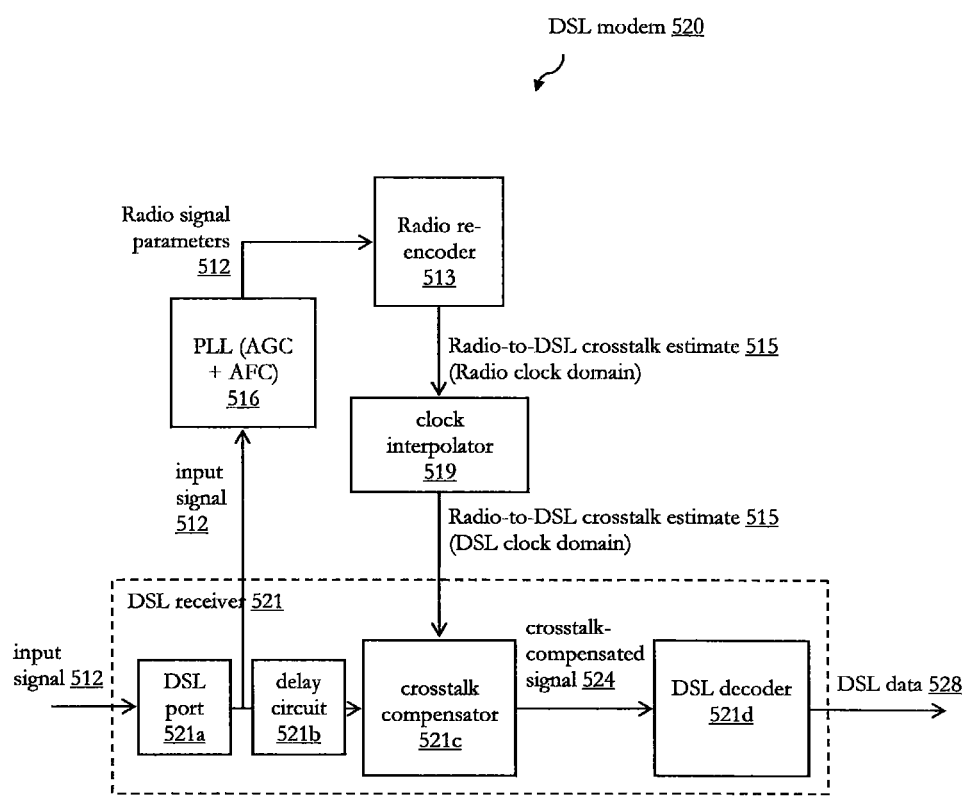
FIG. 18 is a schematic block diagram illustrating a DSL modem according to an embodiment, the DSL modem having a Radio re-encoder to determine a Radio-to-DSL crosstalk estimate.

FIG. 18 shows a further embodiment of a DSL device. DSL modem 520 comprises a DSL receiver 521 arranged to receive an input signal 512 comprising a DSL contribution 512a and a Radio-to-DSL crosstalk contribution 512b. As the PLC modem of FIG. 16, the DSL modem 520 comprises a Phase Locked Loop unit 516 which applies Automatic Gain Control (AGC) and Automatic Frequency Control (AFC) to the input signal. Similar to what is described with regard to FIG. 16, DSL modem 520 determines a Radio-to-DSL crosstalk estimate 515 to compute a crosstalk-compensated signal 524.

Figure 19:
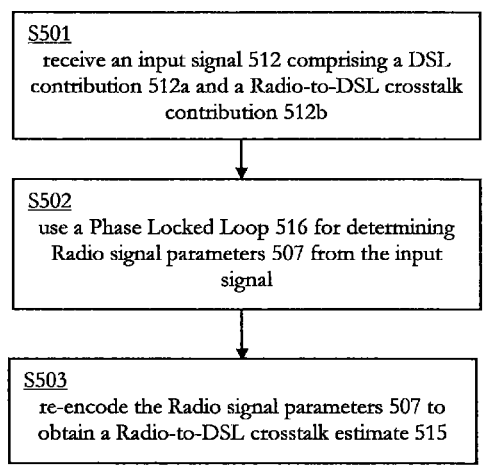
FIG. 19 shows a flowchart of a method for determining a Radio-to-DSL crosstalk estimate according to an embodiment.

FIG. 19 shows a flowchart of a method for determining a Radio-to-DSL crosstalk estimate according to an embodiment. At S501 an input signal 512 comprising a DSL contribution 512a and a Radio-to-DSL crosstalk contribution 512b is received. At S502 a Phase Locked Loop 516 is used for determining Radio signal parameters 507 from the input signal 512. At S503, the Radio signal parameters 507 are re-encoded to obtain a Radio-to-DSL crosstalk estimate 515.

PLC-to-Radio Crosstalk Estimator

Modern digital broadband radio broadcast transmission may use the same modulation techniques and frequency ranges as used by PLC and DSL modems. PLC and DSL communications may well interfere with radio signals received in broadband radio receivers. The mechanisms of crosstalk compensation disclosed above may also be applied to such broadband radio receivers.

Figure 20:
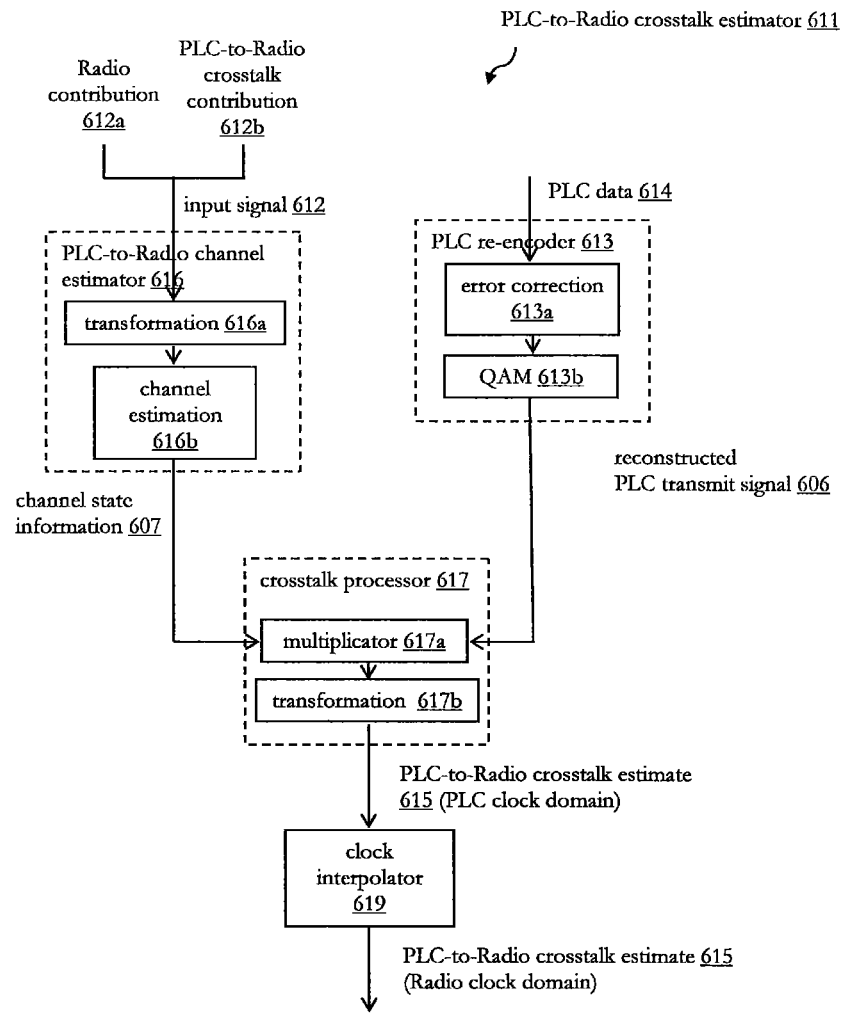
FIG. 20 is a schematic block diagram illustrating a PLC-to-Radio crosstalk estimator according to an embodiment.

FIG. 20 shows an embodiment of a PLC-to-Radio crosstalk estimator 611. The PLC-to-Radio crosstalk estimator 611 is similar to the PLC-to-DSL crosstalk estimator 11 disclosed in FIG. 4. A PLC-to-Radio channel estimator 616 is used to determine channel state information 607 of the transmission channel which is responsible for PLC-to-Radio crosstalk contribution 612b. A PLC re-encoder 613 obtains a reconstructed PLC transmit signal 606 from input PLC data 614. A crosstalk processor 617 computes a PLC-to-Radio crosstalk estimate 615. A clock interpolator 619 may optionally transform the PLC-to-Radio crosstalk estimate 615 from a PLC clock domain to a Radio clock domain. The PLC-to-Radio crosstalk estimator 611 may be implemented in a digital broadband radio receiver to generate a crosstalk compensated signal according to the same principles as disclosed with regard to the DSL receiver disclosed in FIG. 6.

Figure 21:
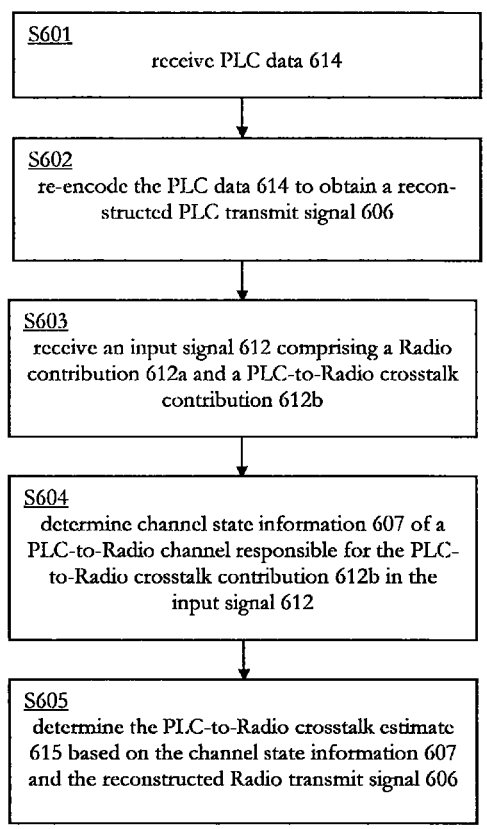
FIG. 21 shows a flowchart of a method for determining a PLC-to-Radio crosstalk estimate according to an embodiment.

FIG. 21 shows a flowchart of a method for determining a PLC-to-Radio crosstalk estimate according to an embodiment. At S601, PLC data 614 is received. At S602, the PLC data 614 is re-encoded to obtain a reconstructed PLC transmit signal 606. At S603, an input signal 612 comprising a Radio contribution 612a and a PLC-to-Radio crosstalk contribution 612b is received. At S604, channel state information 607 of a PLC-to-Radio channel responsible for the PLC-to-Radio crosstalk contribution 612b in the input signal 612 is determined. At S605, the PLC-to-Radio crosstalk estimate 615 is determined based on the channel state information 607 and the reconstructed PLC transmit signal 606. It should be noted that, other than shown in FIG. 21, steps S603 and S604 can also be performed at the same time or earlier than steps S601 and S602.

DSL-to-Radio Crosstalk Estimator

Figure 22:
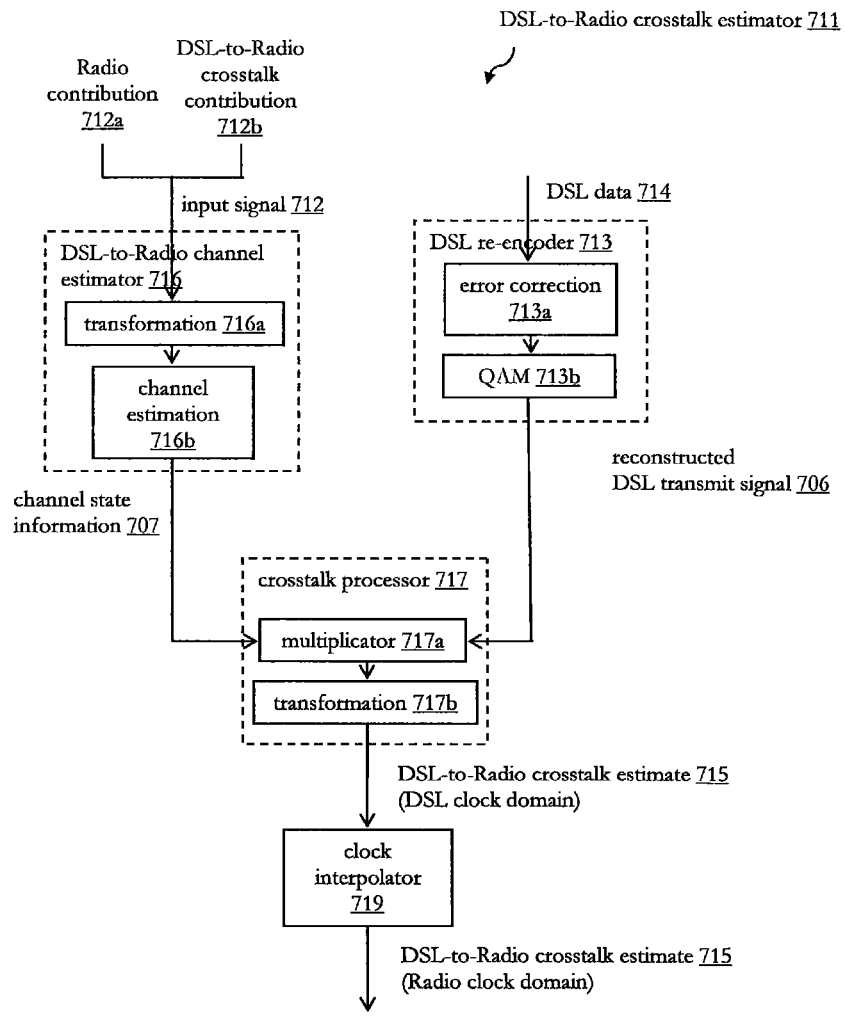
FIG. 22 is a schematic block diagram illustrating a DSL-to-Radio crosstalk estimator according to an embodiment.

FIG. 22 shows an embodiment of a DSL-to-Radio crosstalk estimator 711. The DSL-to-Radio crosstalk estimator 711 is similar to the PLC-to-Radio crosstalk estimator 611 disclosed in FIG. 20. A DSL-to-Radio channel estimator 716 is used to determine channel state information 707 of the transmission channel which is responsible for DSL-to-Radio crosstalk contribution 712b in input signal 712. A DSL re-encoder 713 obtains a reconstructed DSL transmit signal 706 from DSL data 714. A crosstalk processor 717 computes a DSL-to-Radio crosstalk estimate 715. A clock interpolator 719 may in one embodiment transform the DSL-to-Radio crosstalk estimate 715 from a DSL clock domain to a Radio clock domain. The DSL-to-Radio crosstalk estimator 711 may be implemented in a digital broadband radio receiver to generate a crosstalk compensated signal according to the same principles as disclosed with regard to the Radio receiver in FIG. 20.

Figure 23:
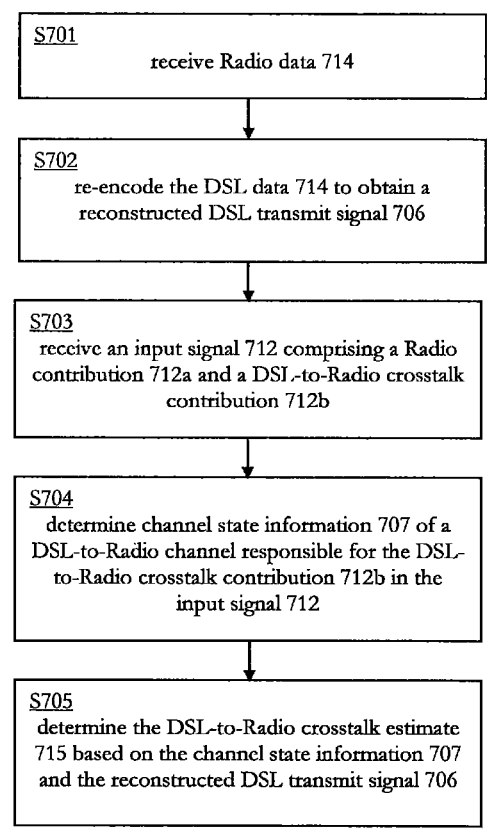
FIG. 23 shows a flowchart of a method for determining a DSL-to-Radio crosstalk estimate according to an embodiment.

FIG. 23 shows a flowchart of a method for determining a DSL-to-Radio crosstalk estimate according to an embodiment. At S701, DSL data 714 is received. At S702, the DSL data 714 is re-encoded to obtain a reconstructed DSL transmit signal 706. At S703, an input signal 712 comprising a Radio contribution 712a and a DSL-to-Radio crosstalk contribution 712b is received. At S704, channel state information 707 of a DSL-to-Radio channel responsible for the DSL-to-Radio crosstalk contribution 712b in the input signal 712 is determined. At S705, the DSL-to-Radio crosstalk estimate 715 is determined based on the channel state information 707 and the reconstructed DSL transmit signal 706. It should be noted that, other than shown in FIG. 23, steps S703 and S704 can also be performed at the same time or earlier than steps S701 and S702.

Using a Symmetrical 3-Wire Power Supply Cable with Common Mode Choke to Remove Interference In all described embodiments, interference cancellation can be further enhanced by optionally using symmetrical 3-wire power supply cables to the DSL modem. Interference cancellation can be further optionally enhanced by using a common mode choke among all three wires of the power supply cables to the DSL modem, which increases symmetry of signals in modems connected to the mains. Using 3-wire power supply cables (phase, neutral, earth) and common mode chokes is particularly helpful with MIMO PLC signals in which unsymmetries occur if a third wire is not present in the power supply to the DSL modem. If symmetry among the wires is high, no common mode (CM) conversion will happen at DSL modems and less interference will be noticeable at operation of DSL modems. Increasing symmetry by adding common mode chokes at the telecommunication wire would also help to remove interferences between DSL and PLC.

Using 3-wire power supply cables a PLC signal can be fed into the power line according to several different feeding schemes. The interference can be minimized by choosing the optimal feeding scheme which is known to exhibit the lowest interference. Feeding schemes which are applicable with 3-wire power supply cables can be obtained from ETSI TR 101 562, "PowerLine Telecommunications (PLT); MIMO PLT Universal Coupler, Operating Instructions—Description"; ETSI 2011.

Entities and Units Described in this Specification

All units and entities described in this specification and claimed in the appended claims can be, if not stated otherwise, implemented as integrated circuit logic, for example on a chip.

The present application claims priority to European Patent Application 13 175 441.8, filed in the European Patent Office on Jul. 5, 2013, the entire contents of which being incorporated herein by reference.

The invention claimed is:

1. An apparatus for determining a PLC-to-DSL crosstalk estimate, the apparatus comprising:
   circuitry configured to
   receive an input signal, comprising a DSL contribution and a PLC-to-DSL crosstalk contribution, the DSL contribution being a DSL data signal, and arranged to determine channel state information of a PLC-to-DSL channel responsible for the PLC-to-DSL crosstalk contribution in the input signal; and
   determine the PLC-to-DSL crosstalk estimate based on the channel state information and a PLC transmit signal.

2. An apparatus for determining a PLC-to-DSL crosstalk estimate, the apparatus comprising:
   circuitry configured to
   receive PLC data and re-encode the received PLC data to obtain a reconstructed PLC transmit signal;
   receive an input signal, comprising a DSL contribution and a PLC-to-DSL crosstalk contribution;
   determine channel state information of a PLC-to-DSL channel responsible for the PLC-to-DSL crosstalk contribution in the input signal; and
   determine the PLC-to-DSL crosstalk estimate based on the channel state information and the reconstructed PLC transmit signal.

3. An apparatus for determining a PLC-to-DSL crosstalk estimate, the apparatus comprising:
   circuitry configured to
   receive an input signal, comprising a DSL contribution and a PLC-to-DSL crosstalk contribution;
   determine channel state information of a PLC-to-DSL channel responsible for the PLC-to-DSL crosstalk contribution in the input signal;
   determine the PLC-to-DSL crosstalk estimate based on he channel state information and a PLC transmit signal; and
   receive the PLC-to-DSL crosstalk estimate and transfer the PLC-to-DSL crosstalk estimate from a PLC clock domain to a DSL clock domain.

4. A DSL device comprising:
   circuit configured to
   receive an input signal comprising a DSL contribution and a PLC-to-DSL crosstalk contribution;
   receive a PLC input signal and decode the received PLC input signal to obtain PLC data corresponding to the received PLC input signal;
   determine channel state information of a PLC-to-DSL channel responsible for the PLC-to-DSL crosstalk contribution in the input signal,
   determine a PLC-to-DSL crosstalk estimate from the channel state information, the PLC data, and the input signal comprising the PLC-to-DSL crosstalk contribution; and
   determine a crosstalk-compensated signal based on the received input signal and the PLC-to-DSL crosstalk estimate.

5. The DSL device of claim 4, wherein the circuitry is further configured to delay the received input signal to compensate for a delay of the PLC-to-DSL crosstalk estimate with respect to the PLC-to-DSL crosstalk contribution in the input signal.

6. The DSL device of claim 4, the DSL device further comprising a DSL transmitter and a PLC transmitter.

7. A method for determining a PLC-to-DSL crosstalk estimate, the method comprising:
   receiving PLC data;
   re-encoding the PLC data to obtain a reconstructed PLC transmit signal;
   receiving an input signal comprising a DSL contribution and a PLC-to-DSL crosstalk contribution;
   determining channel state information of a PLC-to-DSL channel responsible for the PLC-to-DSL crosstalk contribution in the input signal;
   determining the PLC-to-DSL crosstalk estimate based on the channel state information and the reconstructed PLC transmit signal.

* * * * *